United States Patent
Chabanne et al.

(10) Patent No.: US 10,938,576 B2
(45) Date of Patent: Mar. 2, 2021

(54) METHOD FOR ELECTRONIC SIGNING OF A DOCUMENT WITH A PREDETERMINED SECRET KEY

(71) Applicant: IDEMIA IDENTITY & SECURITY FRANCE, Issy-les-Moulineaux (FR)

(72) Inventors: Herve Chabanne, Issy-les-Moulineaux (FR); Emmanuel Prouff, Issy-les-Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 334 days.

(21) Appl. No.: 15/915,019

(22) Filed: Mar. 7, 2018

(65) Prior Publication Data
US 2018/0262343 A1  Sep. 13, 2018

(30) Foreign Application Priority Data

Mar. 8, 2017 (FR) .................................. FR1751894

(51) Int. Cl.
*H04L 9/32* (2006.01)
*H04L 9/30* (2006.01)
(Continued)

(52) U.S. Cl.
CPC ............ *H04L 9/3252* (2013.01); *G06F 7/723* (2013.01); *H04L 9/0825* (2013.01);
(Continued)

(58) Field of Classification Search
CPC ..... G06F 7/723; H04L 9/3252; H04L 9/3006; H04L 9/0861; H04L 9/0825; H04L 2209/16
See application file for complete search history.

(56) References Cited

U.S. PATENT DOCUMENTS 6,064,740 A * 5/2000 Curiger ................... G06F 7/723
                                                        380/264
7,194,618 B1 * 3/2007 Suominen ............. H04L 63/123
                                                        713/155
(Continued)

FOREIGN PATENT DOCUMENTS

EP          3059894 A1      8/2016
WO     2009/136361 A1     11/2009

OTHER PUBLICATIONS

Preliminary Research Report and Written Opinion received for French Application No. 1751894, dated Nov. 14, 2017, 5 pages (1 page of French Translation Cover Sheet and 4 pages of original document).

(Continued)

*Primary Examiner* — Saleh Najjar
*Assistant Examiner* — Feliciano S Mejia
(74) *Attorney, Agent, or Firm* — Womble Bond Dickinson (US) LLP

(57) ABSTRACT

The present invention relates to a method for electronic signing of a document with a predetermined secret key (x), the method being characterized in that it comprises the implementation of steps of:
(a) Drawing a pair formed by a first internal state ($s_1^i$) and a white-box implementation ($WB_i$) of a modular arithmetic operation, from among a set of predetermined pairs ($\{(s_1^i, WB_i)\}_{i \in [0, n-1]}$) each for one nonce ($k_i$), said first internal state ($s_1^i$) being a function of the nonce ($k_i$) and said modular arithmetic operation being a function of the first internal state ($s_1^i$), of the nonce ($k_i$) and of the secret key (x);
(b) Determining a second internal state ($s_2^i$) by application of said drawn white-box implementation ($WB_i$) to a condensate of the document obtained via a given hash function;

(Continued)

(c) Generating an electronic signature of the document from the first internal state ($s_1^i$) of the drawn pair and from the second determined internal state ($s_2^i$), and deleting the drawn pair of said set of pairs ($\{(s_1^i, WB_i)\}_{i \in [0,n-1]}$).

12 Claims, 1 Drawing Sheet

(51) Int. Cl.
*G06F 7/72* (2006.01)
*H04L 9/08* (2006.01)

(52) U.S. Cl.
CPC .......... *H04L 9/0861* (2013.01); *H04L 9/3006* (2013.01); *H04L 2209/16* (2013.01)

(56) References Cited

U.S. PATENT DOCUMENTS

| | | | |
|---|---|---|---|
| 7,809,135 B2* | 10/2010 | Johnson | G06F 21/14 380/44 |
| 8,094,816 B2* | 1/2012 | Ciet | H04L 9/002 380/29 |
| 9,009,481 B2* | 4/2015 | Muir | H04L 9/3066 713/176 |
| 9,264,234 B2* | 2/2016 | Farrugia | H04L 9/3247 |
| 9,390,154 B1* | 7/2016 | Baird, III | G06F 16/22 |
| 9,531,540 B2* | 12/2016 | Peeters | H04L 9/3249 |
| 9,652,200 B2* | 5/2017 | Bos | G06F 7/4812 |
| 9,692,592 B2* | 6/2017 | Kindarji | H04L 9/0631 |
| 10,333,702 B2* | 6/2019 | Roelse | H04L 9/0838 |
| 10,523,419 B2* | 12/2019 | Kinasz | G06F 21/14 |
| 2005/0002532 A1* | 1/2005 | Zhou | H04L 9/302 380/277 |
| 2012/0087494 A1* | 4/2012 | Spalka | H04L 9/0825 380/46 |
| 2012/0308003 A1* | 12/2012 | Mukherjee | H04L 9/3247 380/243 |
| 2016/0239267 A1 | 8/2016 | Bos et al. | |
| 2016/0328543 A1 | 11/2016 | Hoogerbrugge et al. | |
| 2017/0289134 A1* | 10/2017 | Bradley | H04L 63/102 |
| 2019/0190723 A1* | 6/2019 | Lee | H04L 63/0884 |

OTHER PUBLICATIONS

Hwang et al., "Digital Signature Schemes with Restriction on Signing Capability", Lecture Notes in Computer Science, LNCS vol. 2727, ACISP 2003, pp. 324-335.
European Search Report and Written Opinion received for EP Patent Application No. 18160420.8, dated Jul. 26, 2018, 8 pages of Original Document Only.

\* cited by examiner

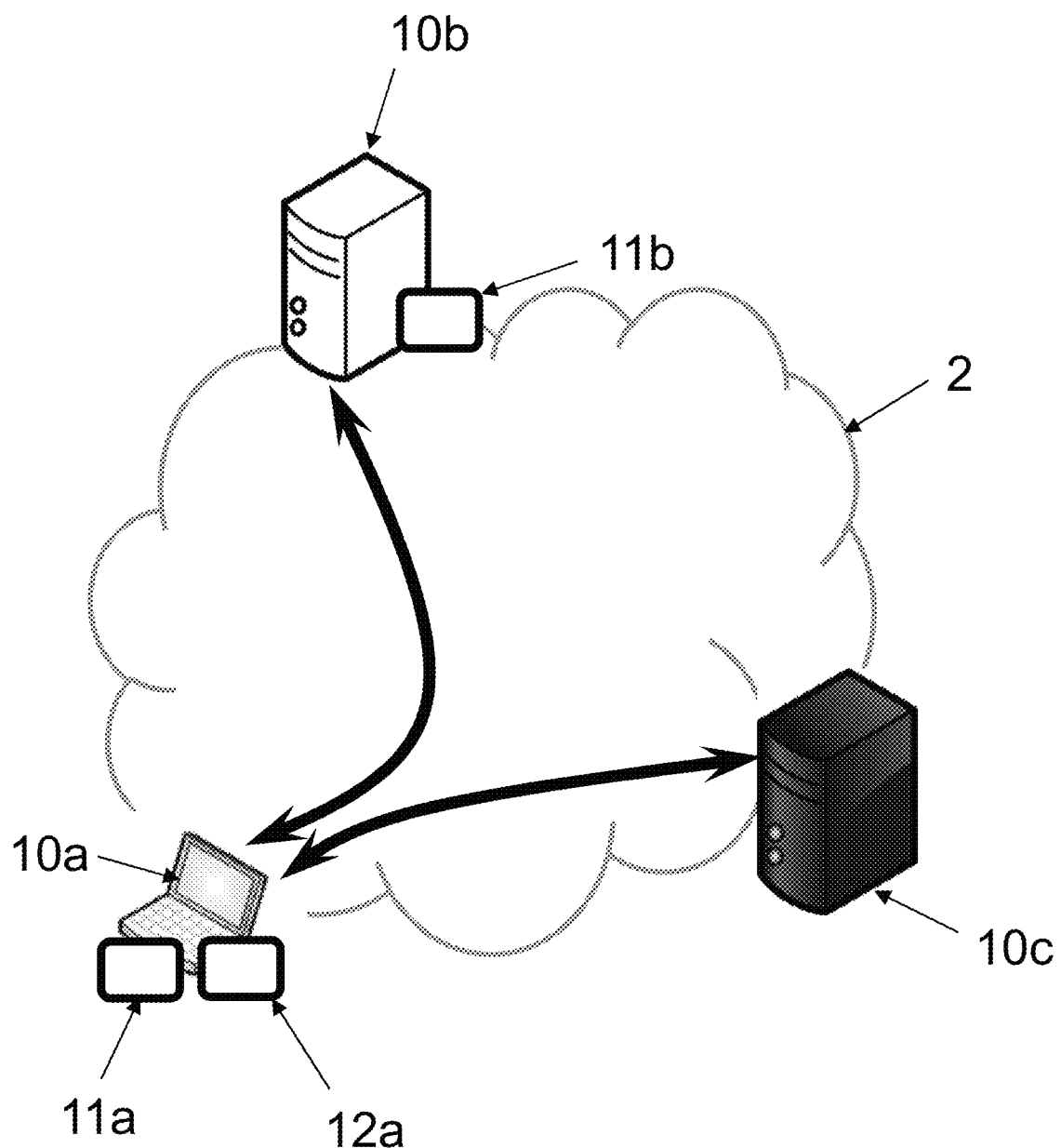

METHOD FOR ELECTRONIC SIGNING OF A DOCUMENT WITH A PREDETERMINED SECRET KEY

GENERAL TECHNICAL FIELD

The present invention relates to the field of cryptography and in particular a signature method of "white-box" type.

STATE OF THE ART

A function is considered to be "black-box" when it is impossible to access its internal functioning i.e. it is possible to have knowledge of the inputs and outputs thereof but not its secret parameters or intermediate states.

Cryptographic algorithms (e.g. for encryption or signature) are conventionally assumed to be black-boxes when evaluating the reliability thereof (resistance to attacks).

A black-box hypothesis requires strong restrictions for storage and handling of these parameters. However, tools have recently been published allowing the automation of attacks on hardware implementation, called side channel attacks or fault-injection attacks.

At the current time, in numerous cases of use including payment by mobile, it is necessary to deploy cryptographic algorithms with the least number of hypotheses possible concerning the security of the target material. Secure storage and handling of secret parameters must therefore be ensured at application level.

So-called white-box cryptography is aimed at meeting this challenge by proposing implementation of cryptographic algorithms that are meant to make the extraction of secrets impossible, even in the event of attack providing an attacker with full access to software implementation of the algorithm. More specifically, a function is considered to be "white-box" when its mechanisms are visible allowing understanding of the functioning thereof. In other words, the hypothesis is directly made that attackers have access to everything they want (the binary is fully visible and can be modified by an attacker who has full control over the execution platform). As a result, implementation itself is the only line of defence. The term "white-box implementation" is used for elementary computation of the algorithm when this computation is able to be represented in secure form avoiding plaintext use of keys, for example by representing the computation via a table stored in memory.

For example, a method was proposed in application US2016/328543 aimed at hiding the inputs and outputs of a modular exponentiation function, allowing improved security of cryptographic algorithms such as RSA (Rivest, Shamir, Adleman).

However, it has been shown that this method is not sufficient to ensure satisfactory protection of the Digital Signature Algorithm (DSA).

The computing of a DSA signature pre-assumes that a public key (p,q,g,y) and a private key x have been associated with the user. The method for generating these keys is composed of the following different steps:
- Choosing a prime number p of length L such that $512 \leq L \leq 1024$, and L is divisible by 64;
- Choosing a prime number q of 160 bits, such that $p-1=qc$, with c being an integer;
- Choosing h with $1 < h < p-1$ to construct g, so that $g = h^c \mod p > 1$;
- Randomly generating an x, with $0 < x < q$;
- Computing $y = g^x \mod p$.

The DSA signature of a message m starts with computation of a hash H(m) (using a standard hash function such as SHA256) and continues with the computing of two values $s_1$ and $s_2$ such that:

$s_1 = (g^k \mod p) \mod q$ $s_2 = (H(m) + s_1 x) k^{-1} \mod q$ where k is a datum called nonce (i.e. an arbitrary number i.e. a "number used once") that must be randomly drawn for each new signature.

The signature is $(s_1, s_2)$.

As explained, it is possible to obtain white-box implementations of each of the computing functions of the internal states $s_1$ and $s_2$ by hiding the modular exponentiation.

However, with the same application of white-box implementation of $s_2$ to two different data z and z' (e.g. the condensates of two different messages) while forcing reuse of one same nonce k (which is normally impossible except under a white-box attack with access to the equipment), it is possible via computing of $s_2(z) - s_2(z')$ to retrieve x. This is called a "restart attack".

It would therefore be desirable to have available a novel solution for "white-box" signatures using a standard mechanism such as DSA, that is fully resistant to any known attacks.

SUMMARY OF THE INVENTION

In a first aspect, the present invention relates to a method for electronic signing of a document with a predetermined secret key, the method being characterized in that it comprises the implementation, by data processing means of equipment, of steps of:
- (a) Drawing a pair formed by a first internal state and a white-box implementation of a modular arithmetic operation, from among a set of predetermined pairs each for one nonce, said set of pairs being stored on data storage means of the equipment, said first internal state being a function of the nonce and said modular arithmetic operation being a function of the first internal state, of the nonce and of the secret key;
- (b) Determining a second internal state by application of said drawn white-box implementation to a condensate of the document obtained via a given hash function;
- (c) Generating an electronic signature of the document from the first internal state of the drawn pair and from the second determined internal state and deleting the drawn pair of said set of pairs.

According to other nonlimiting, advantageous characteristics:
- said modular arithmetic operation is $z \mapsto (z + s_1^i x) k_i^{-1} \mod q$, where $s_1^i$ is the first internal state, $k_i$ the nonce, x the secret key and q a constant;
- $s_1^i = (g^{k_i} \mod p) \mod q$, where g and p are constants;
- the signature is the pair $(s_1^i, s_2^i)$ of the first and second internal states;
- the method comprises a prior step (a0) to generate said set of pairs by data processing means of a server, and transmission thereof to the equipment;
- step (a0) comprises the generation of a plurality of nonces, followed by the generation of the pair for each nonce;
- step (a0) comprises the prior generation of the constants p,q,g conforming to the DSA algorithm;
- step (a0) also comprises the prior generation of the secret key and of an associated public key as a function of the constants p,q,g;

said white-box implementations use a Residue Number System, RNS, to perform said modular arithmetic operation;

the method comprises a subsequent step (d) by the data processing means of the equipment to associate the generated electronic signature with the document to form the signed document.

In a second and third aspect, the invention proposes a computer program product comprising code instructions to execute a method according to the first aspect for electronic signing of a document with a predetermined secret key; and storage means readable by computing equipment on which a computer program product comprises code instructions to execute a method according to the first aspect for electronic signing of a document with a predetermined secret key.

PRESENTATION OF THE FIGURES

Other characteristics and advantages of the present invention will become apparent on reading the following description of a preferred embodiment. This description is given with reference to the appended drawings in which:

FIG. 1 is a diagram of an architecture for implementation of the method of the invention.

DETAILED DESCRIPTION

Architecture

With reference to FIG. 1, a method is proposed for the "white-box" signature of a document, implemented on equipment $10a$ such as a mobile terminal (smartphone, tablet computer, etc.) i.e. an item of equipment not having any particularly secure material and that may be the subject of side channel attack, for which the white-box approach shows its advantage.

The equipment $10a$ comprises data processing means $11a$ (a processor) and data storage means $12a$ (a memory e.g. flash memory).

The equipment $10a$ is connected for example to a server $10b$ e.g. via the internet $20$. From this server $10b$ (e.g. the server of a provider of security solutions) it may need to receive cryptographic objects (described below) containing secrets to be stored in the memory $12a$ and used to implement the present method.

The equipment $10a$ may itself be connected to other third-party servers $10c$ to which it may transmit the signed document once it has generated the electronic signature.

Signature Method

The present method is indeed a method for "generating an electronic signature for a document", and not "for signing a document". This means that it only allows the electronic signature of the document to be obtained and not the "signed document" i.e. the association of the original document and the signature, generally in any container.

By "electronic signature" of a document is meant the conventional definition of the term, namely a cryptographic primitive allowing identification of the signatory and guaranteeing that document has not been altered since the time the signature was produced and is indeed the original document (in the remainder of the present description the term "original" designates the document from which the condensate is truly derived). This cryptographic object is generally an encryption of the document condensate obtained by means of an asymmetric encryption function: the signatory uses a private key, and the signature can be verified by everyone by means of a public key (by comparing the condensate contained in the signature with a recalculated condensate).

It will be understood that the present method is a novel implementation of known algorithms using modular arithmetic operations (i.e. operations comprising computation over a modulus, in particular modular exponentiations), in particular DSA which is the current standard and shall be used as an example in the remainder of the description. More specifically, it does not propose a novel signature strategy but only a new manner in which to handle data within the algorithm, that is resistant to all side channel "white-box" attacks.

The document is associated with a condensate obtained via a given hash function.

As explained, a hash function uses as input a message of arbitrary size (the original document) and produces a condensate of fixed size associated with this message. Here, said given hash function is advantageously a so-called cryptographic function i.e. having additional properties: the condensate is statistically well distributed over all the input values, it is impossible within a reasonable time to find two messages having the same condensate (collision resistance) and it is not possible from the condensate to find a message which allowed this value to be obtained (pre-image resistance).

The example will be taken of functions in the SHA family (Secure Hash Algorithm), standardized by the National Institute of Standards and Technology (NIST), in particular the sub-families SHA-1 or SHA-2 (particularly SHA-256).

Principle

The present invention, for one same pair of public/private keys, proposes pre-computing several values of a first internal state $s_1^i$ each one for a nonce $k_i$, followed by white-box implementation $WB_i$ of a modular arithmetic operation used by the signature algorithm for each of the nonces $k_i$, said modular arithmetic operation being a function of the first internal state $s_1^i$, of the nonce $k_i$ and of the secret key x. It is recalled that by "white-box implementation" of an operation it is meant a representation of the operation which does not allow reverse engineering back to the internal state or to the parameters when the operation is executed (by application of white-box implementation to the input data).

Therefore, a set of pairs $\{(s_1^i, WB_i)\}_{i \in [0, n-1]}$ of the first internal state $s_1^i$ and of white-box implementation $WB_i$ of the modular arithmetic operation are predefined and stored on the data storage means $12a$ of the equipment $10a$.

In other words, for fixed public/private keys, each pair $(s_1^i, WB_i)$ is fully determined by the nonce $k_i$: drawing a nonce is equivalent to drawing a pair. The nonce $k_i$ is therefore not an input datum of white-box implementation $WB_i$ but an "encapsulated" parameter which cannot be reverse engineered by an attacker.

Preferably, said set of pairs $\{(s_1^i, WB_i)\}_{i \in [0, n-1]}$ is generated by the data processing means $11b$ of the server $1b$, and transmitted for storage in the equipment $10a$ at a prior step (a0).

This generation may comprise the generating of the plurality of nonces $\{k_i\}_{i \in [0, n-1]}$, followed by generation of the pair $(s_1^i, WB_i)$ for each nonce $k_i$ so as to define the set $\{(s_1^i, WB_i)\}_{i \in [0, n-1]}$.

The properties expected from the application of white-box implementation mean that observation of the executing of white-box implementation $WB_i$ must not allow retracing of the values of the secret key x and of the nonce $k_i$ embedded in the computation. It is sufficient therefore only to allow one-time use of each $WB_i$ to prevent tracing back to $k_i$ and thereby prevent restart attacks. With the proposed signature method, it is therefore possible to resist an attacker using observation of intermediate states (for example using a malicious application running on the mobile).

White-box implementations $WB_i$ (and hence the pairs of a first state and of a white-box implementation) are therefore deleted after use to prevent any possible attack.

Preferred Embodiment

In the example in which the signature algorithm conforms to DSA, $s_1^i$ can be equivalent to $(g^{k_i} \bmod p) \bmod q$, where g, p and q are constants (in particular prime numbers for p and q).

Similarly, said modular arithmetic operation represented by white-box implementation $WB_i$ can be $z \mapsto (z+s_1^i x)k_i^{-1} \bmod q$. It is easy to verify that this computation corresponds to that of $s_2^i$ associated with previously generated $s_1^i$, for a condensate value z of the message.

The values p,q,g are preferably predetermined conforming to the DSA algorithm, in particular by the data processing means 11b of the server 10b at the prior step (a0).

It is recalled that in DSA, (p,q,g,y) forms a public key generated with a private key x in the following manner:
Choosing a prime number p of length L such that 512≤L≤1024, and L is divisible by 64;
Choosing a prime number q of 160 bits, such that p−1=qc, with c being an integer;
Choosing h, with 1<h<p−1 so that $g=h^c \bmod p>1$;
Randomly generating an x, with 0<x<q
Computing $y=g^x \bmod p$ Persons skilled in the art will understand however that the present method is not limited to DSA and gives satisfaction for any signature algorithm comprising a modular arithmetic operation that is a function of a first internal state, of a nonce and of a secret key.

Implementation

The present method is implemented by the data processing means 11a of equipment 10a and starts with step (a) to draw a pair formed by a first internal state $s_1^i$ and a white-box implementation $WB_i$ of a modular arithmetic operation, from among said set of predetermined pairs $\{(s_1^i, WB_i)\}_{i \in [0,n-1]}$ stored on data storage means 12a of the equipment 10a.

This drawing may be random or sequential, it amounts to drawing a nonce $k_i$ since each pair $(s_1^i, WB_i)$ is fully determined by the nonce $k_i$ from which it was generated.

At step (b), a second internal state $s_2^i$ is determined by application of said drawn white-box implementation $WB_i$ to a condensate H(m) of the document m (obtained via a given hash function such as SHA256). In other words, z=H(m) is used.

From here, at a third step (c), the electronic signature of the document can be generated from the first internal state $s_1^i$ of the drawn pair and from the second internal state $s_2^i$ determined at step(b). In the preferred example of DSA, the signature is simply $(s_1^i, s_2^i)$.

Step (c), as explained, also comprises deletion of the pair drawn from said set of pairs $\{(s_1^i, WB_i)\}_{i \in [0,n-1]}$ (before or after generation of the signature) to prevent restart attacks.

Additionally, the method may comprise a subsequent step (d) performed by the data processing means 11a of the equipment 10a to associate the electronic signature with the document to form the signed document. This electronic signature can be legally invoked by the equipment 10a with other entities (servers 10c).

White-Box Implementation

The white-box implementation of modular arithmetic operations is known to skilled persons.

However, the application of white-box implementation to execute the represented operation may be lengthy, in particular if said modular arithmetic operation comprises modular exponentiations.

In this respect, preferably said white-box implementations $WB_i$ use a Residue Number System (RNS) to perform said modular arithmetic operation.

More specifically, the principle of RNS implementation allows the decomposing of moduli computations of a given value into moduli computation of smaller prime numbers, the product of which is greater than said given value (using the Chinese Remainder Theorem).

For example, those skilled in the art may proceed as described in application US2016/239267.

Computer Program Product

In second and third aspects, the invention relates to a computer program product comprising code instructions for execution (in particular on the data processing means 11a of the equipment 10a) of a method according to the first aspect of the invention for electronic signing of a document with a predetermined secret key x, and to storage means readable by computing equipment (memory 12a of the equipment 10a) on which this computer program product is installed.

The invention claimed is:

1. Method for electronic signing of a document with a predetermined secret key, x, the method being characterized in that it comprises the implementation, by a data processor of equipment, of steps of:
(a) Drawing a pair formed by a first internal state, $s_1^i$, and a white-box implementation, $WB_i$, of a modular arithmetic operation, from among a set of predetermined pairs, $\{(s_1^i, WB_i)\}_{i \in [0,n-1]}$, each one nonce, $k_i$, said set of pairs $\{(s_1^i, WB_i)\}_{i \in [0,n-1]}$ being stored on a memory of the equipment, said first internal state $s_1^i$ being a function of the nonce $k_i$ and said modular arithmetic operation being a function of the first internal state $s_1^i$, of the nonce $k_i$ and of the secret key x;
(b) Determining a second internal state, $s_2^i$, by application of said drawn white-box implementation $WB_i$ to a condensate of the document obtained via a given hash function;
(c) Generating an electronic signature of the document from the first internal state $s_1^i$ of the drawn pair and from the second determined internal state $s_2^i$, and deleting the drawn pair of said set of pairs $\{(s_1^i, WB_i)\}_{i \in [0,n-1]}$.

2. The method according to claim 1, wherein said modular arithmetic operation is $z \mapsto (z+s_1^i x)k_i^{-1} \bmod q$, where $s_1^i$ is the first internal state, $k_i$ the nonce, x the secret key and q a constant.

3. The method according to claim 2, wherein $s_1^i = (g^{k_i} \bmod p) \bmod q$, where g and p are constants.

4. The method according to claim 1, wherein the signature is the pair $(s_1^i, s_2^i)$ of the first and second internal states.

5. The method according to claim 1, comprising a prior step (a0) to generate said set of pairs $\{(s_1^i, WB_i)\}_{i \in [0,n-1]}$ by a data processor of a server, and transmission thereof to the equipment.

6. The method according to claim 5, wherein step (a0) comprises the generation of a plurality of nonces $\{k_i\}_{i \in [0,n-1]}$, followed by the generation of the pair $(s_1^i, WB_i)$ for each nonce $k_i$.

7. The method according to claim 6, wherein said modular arithmetic operation is $z \mapsto (z+s_1^i x)k_i^{-1} \bmod q$, where $s_1^i$ is the first internal state, $k_i$ the nonce, x the secret key and q a constant and $s_1^i=(g^{k_i} \bmod p) \bmod q$, where g and p are constants, and wherein step (a0) comprises the prior generation of the constants p,q,g conforming to the DSA algorithm.

8. The method according to claim 7, wherein step (a0) also comprises the prior generation of the secret key x and of an associated public key as a function of the constants p,q,g.

9. The method according to claim 1, wherein said white-box implementations $WB_i$ use a Residue Number System, RNS, to perform said modular arithmetic operation.

10. The method according to claim 1, comprising a subsequent step (d) by the data processor of the equipment to associate the generated electronic signature with the document to form the signed document.

11. Equipment comprising a memory and a data processor implementing a method for electronic signing of a document with a predetermined secret key, x, the method comprising:

(a) Drawing a pair formed by a first internal state, $s_1^i$, and a white-box implementation, $WB_i$, of a modular arithmetic operation, from among a set of predetermined pairs, $\{(s_1^i,WB_i)\}_{i\in[0,n-1]}$, each for one nonce, $k_i$, said set of pairs $\{(s_1^i,WB_i)\}_{i\in[0,n-1]}$ being stored on a memory of the equipment, said first internal state $s_1^i$ being a function of the nonce $k_i$ and said modular arithmetic operation being a function of the first internal state $s_1^i$, of the nonce $k_i$ and of the secret key x;

(b) Determining a second internal state, $s_2^i$, by application of said drawn white-box implementation $WB_i$ to a condensate of the document obtained via a given hash function;

(c) Generating an electronic signature of the document from the first internal state of the drawn pair and from the second determined internal state $s_2^i$, and deleting the drawn pair of said set of pairs $\{(s_1^i,WB_i)\}_{i\in[0,n-1]}$.

12. Non transitory computer readable medium comprising stored thereon code instruction to execute a method for electronic signing of a document with a predetermined secret key, x the method comprising:

(a) Drawing a pair formed by a first internal state, $s_1^i$, and a white-box implementation, $WB_i$, of a modular arithmetic operation, from among a set of predetermined pairs, $\{(s_1^i,WB_i)\}_{i\in[0,n-1]}$, each for one nonce, $k_i$, said set of pairs $\{(s_1^i,WB_i)\}_{i\in[0,n-1]}$ being stored on a memory of the equipment, said first internal state $s_1^i$ being a function of the nonce $k_i$ and said modular arithmetic operation being a function of the first internal state $s_1^i$, of the nonce $k_i$ and of the secret key x;

(b) Determining a second internal state, $s_2^i$, by application of said drawn white-box implementation $WB_i$ to a condensate of the document obtained via a given hash function;

(c) Generating an electronic signature of the document from the first internal state of the drawn pair and from the second determined internal state $s_2^i$, and deleting the drawn pair of said set of pairs $\{(s_1^i,WB_i)\}_{i\in[0,n-1]}$.

* * * * *